F. W. MEYER.
CONTROLLING AND REGULATING APPARATUS FOR DYNAMO ELECTRIC MACHINES.
APPLICATION FILED DEC. 8, 1917.

1,376,452.

Patented May 3, 1921.

Inventor
Friedrich W. Meyer
By Edwin B. H. Tower Jr.
Atty.

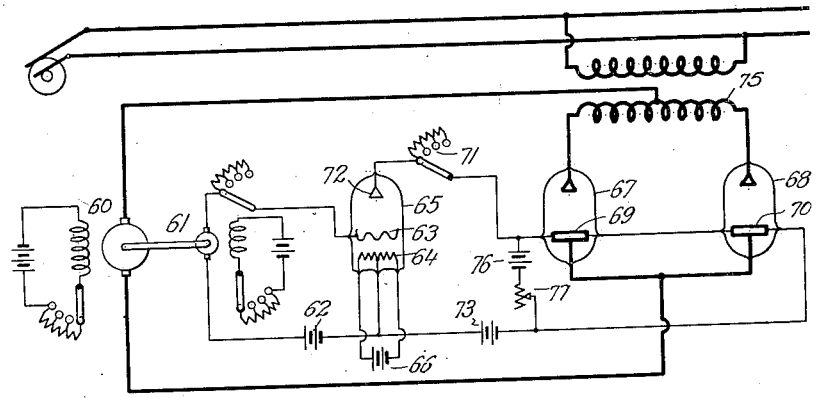
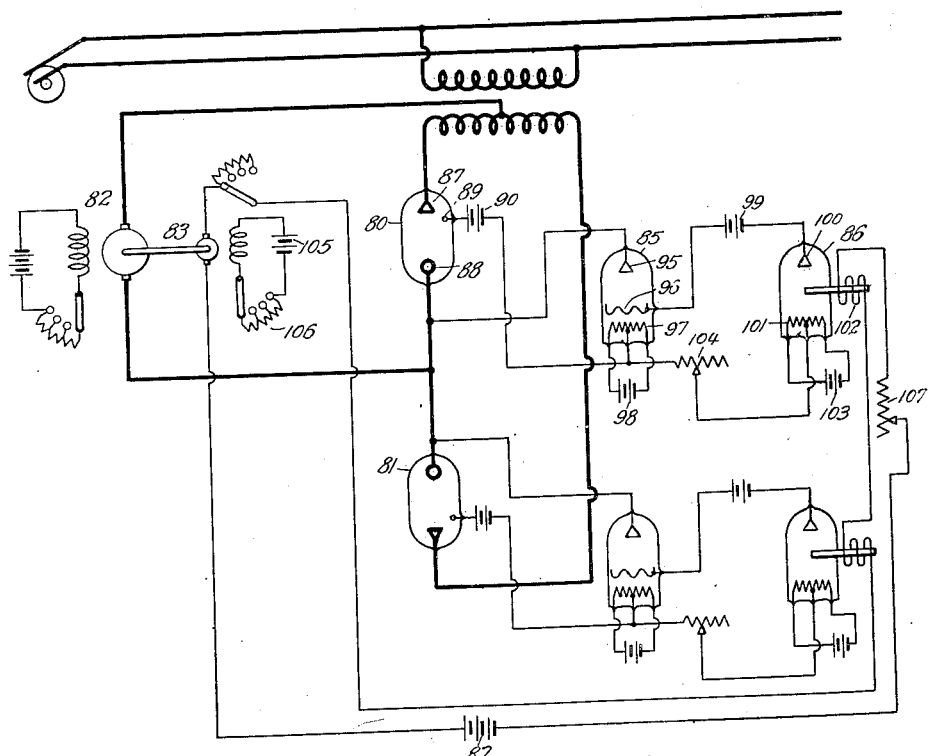

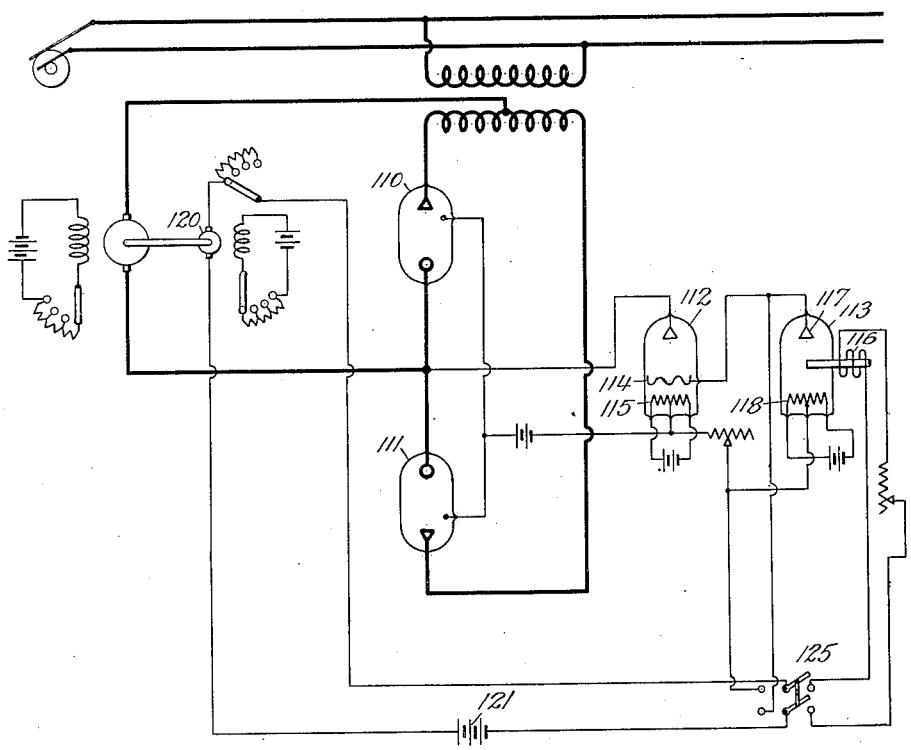

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS FOR DYNAMO-ELECTRIC MACHINES.

1,376,452.     Specification of Letters Patent.     Patented May 3, 1921.

Application filed December 8, 1917. Serial No. 206,356.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Controlling and Regulating Apparatus for Dynamo-Electric Machines, of which the following is a specification.

This invention relates to controlling and regulating apparatus for dynamo electric machines.

More particularly it relates to controlling and regulating apparatus for dynamo electric machines operated by current from an alternating current source.

A direct current motor is in many respects superior to an alternating current motor for driving machinery of most kinds. The principal disadvantage of a direct current motor is that in general it can be built only for moderate voltages and these voltages are not sufficiently high to transmit the energy over considerable distances. It is now, therefore, the general practice to transmit electric energy over greater distances by means of high voltage alternating currents and to transform these higher voltages to a lower voltage by means of static transformers.

When utilizing these alternating currents in direct current apparatus it is usual to employ rotating machinery to transform the alternating current into direct current. This adds to the complications and makes the entire transmission system less reliable and also reduces considerably its efficiency.

On the other hand, a direct current motor, as ordinarily employed, when subjected to a variation in load or impressed voltage, will vary its speed unless regulating means are provided to compensate for the variation in conditions.

Electromagnets, switches and resistances are ordinarily the means through which motors or other dynamo electric machines are regulated. The self-induction of these electromagnets, the mechanical inertia of the switches, the inertia and self-induction of the motor and other things tend to make the regulation tardy and cause it to overrun or hunt. Also the resistance consumes considerable energy.

An object of the present invention is to provide improved means whereby the use of direct current motors, etc., from an alternating current source of supply, is made possible without the use of rotating converting machinery.

A further object is to make possible the operation of such direct current motors, etc., of low voltage from a high voltage alternating current source of supply, through improved stationary means.

Another object is to produce more sensitive and stable regulation and to eliminate or lessen hunting, oscillating and instability tendencies.

Another object is to provide regulating means which will respond to slight variations in conditions and accurately and quickly compensate therefor.

Another object is to lessen the energy consumed for regulation.

Another object is to produce instantaneously upon a variation in conditions, an amplified regulating effect.

Another object is to facilitate controlling the speed or torque of an electric motor.

Other objects will appear from the following specification and claims.

The invention will be explained herein as applying to the control and regulation of an electric motor and the accompanying drawings diagrammatically illustrate some of the ways in which it may be carried out. It will be readily understood, however, that other means may be employed and that the invention is susceptible of being adapted to control and regulate other dynamo electric machines.

In accordance with this invention as employed to operate and regulate a direct current motor, the motor is supplied with direct current from an alternating current source and is regulated primarily through the agency of an electroionic valve, the effect of which is controlled by means which respond to variations in load or other conditions. The electroionic valves may be of the character of those described in my Patent No. 1,353,815, granted September 21, 1920, and the discussion of the operation of these electroionic valves described therein apply to the present case.

In the drawings:

Fig. 5 shows a motor supplied with power from and controlled by two electroionic valves, these valves being controlled through an intermediate electroionic valve or relay.

Fig. 6 shows an arrangement in which the electroionic valves are controlled through an auxiliary discharge which is in turn under the control of an electroionic valve or relay with an auxiliary anode, the latter being controlled by an electroionic valve or relay which is influenced by a magnet which responds to the changes in condition of the motor.

Fig. 7 is a modification of Fig. 6 showing how some of the apparatus may be dispensed with and the connections simplified.

Figure 1:
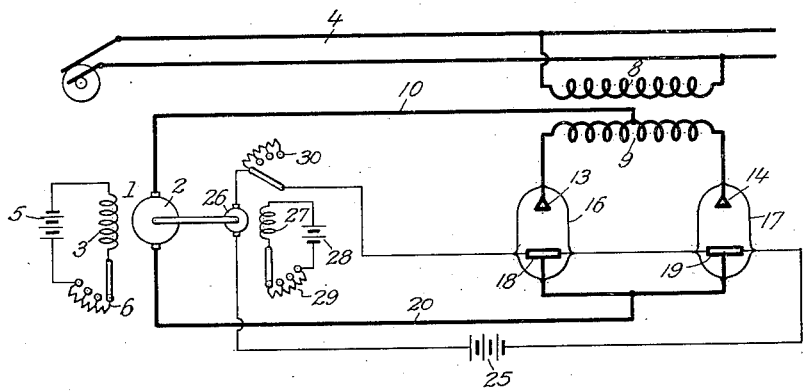
Figure 1 shows a direct current motor supplied with power from an alternating current source and controlled through two electroionic valves.

Fig. 1 will first be described.

A direct current motor 1, having an armature 2, and a field winding 3, is to be driven from an alternating current derived from the main line source 4. The field of the motor is energized from a storage battery 5, the excitation being controlled by a regulator or rheostat 6. The motor armature 2 is supplied from the alternating current power lines 4, through a transformer having a primary winding 8 and a secondary winding 9. The middle point of the secondary 9 is connected to one brush of the motor by conductor 10 and the two outside terminals of the transformer secondary 9 are connected respectively to anodes 13 and 14 of a pair of electroionic valves 16 and 17. The electroionic valves are also provided respectively with cathodes 18 and 19, which are connected together and to the other brush of motor 1 by a lead 20. These electroionic valves may be of the pure electronic, luminous or arc discharge type. The cathodes 18 and 19 are heated by current derived from a storage battery 25 and a tachometer 26. The tachometer is connected to the motor armature so that it responds directly to any changes in the motor speed. It is provided with a field 27, energized from a battery 28, the excitation being controlled by a regulator 29. A regulator 30 is also provided in the circuit, including the battery, tachometer and cathodes. Battery 25 is connected in the circuit in opposition to the voltage generated in the armature of the tachometer 26, so that the amount of heat imparted to the cathodes 18 and 19 is dependent upon the difference in voltage between battery 25 and the tachometer. Normally the voltage of the battery predominates.

One-half of the cycle of the alternating current induced from the line in the transformer secondary 9 passes through the electroionic valve 16 from the anode 13 to the cathode 18, conductor 20, motor armature 2, and conductor 10, back to the secondary. The other half cycle, when the current is in the reverse direction, passes through electroionic valve 17, conductor 20, motor armature 2, and conductor 10, back to the transformer secondary. The alternating current from the source 4 is thereby converted into unidirectional current pulsations which pass through the armature of the motor.

The amount of direct current thus supplied to the motor from the alternating current source is dependent upon the operating condition of the motor and changes with variations in the speed of the motor due to variations in load, voltage or other conditions. The speed of the tachometer 26 varies instantaneously, coincidentally or simultaneously with variations in the speed of the motor and because of the changes thereby produced in its voltage will vary the heating current for the cathodes 18 and 19. This changes the voltage consumed in the vessel of the electroionic valves 16 and 17 to cause a greater or less voltage to be impressed between the motor armature terminals to compensate for variations in conditions and keep the motor speed practically the same.

Any changes in the tachometer voltage practically instantaneously, coincidentally or simultaneously causes a great change in the energy transmitted through the electroionic valves and as a result any tendency of the motor speed to vary is practically checked in its incipiency. The electroionic valves have no mechanical inertia and are free from self induction so that all hunting or instability tendencies are materially lessened or eliminated.

The tachometer, responding to variations in the speed of the motor, effects corrections in the motor speed which are directly responsive to such speed variations and the regulation is more stable than where, as in the usual methods of regulation, the attempt is made to compensate for variations in speed by means responsive to current changes.

The motor speed or torque may be varied at will by varying the resistance in the field of the tachometer machine or otherwise controlling the effect of the electroionic valves.

Through the use of a transformer the ratio between the alternating current voltage and the voltage of the direct current machine may be changed to suit the various conditions of service.

Figure 2:
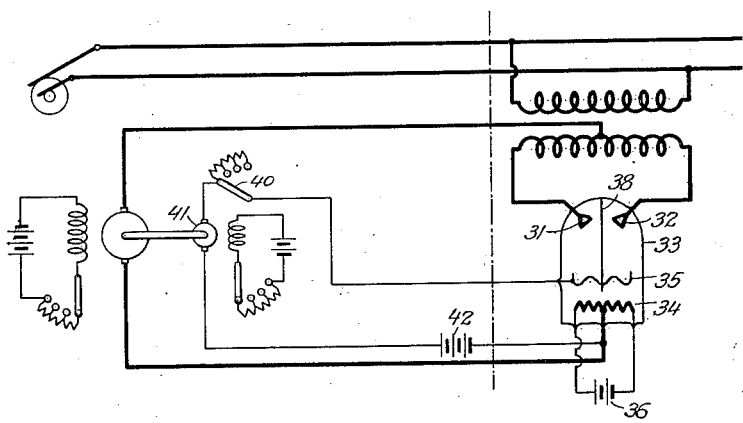
Fig. 2 is a modification of Fig. 1, wherein the two electroionic valves are combined into one duplex valve.

Fig. 2 shows a separately excited direct current motor supplied with power from an alternating current source through an electroionic valve wherein the anodes are located in a single vessel or tube. The current is controlled through the agency of an auxiliary anode, such an arrangement for controlling the action of the electroionic valve being particularly adapted for valves of the pure electronic or luminous discharge types. The transformer secondary is connected to the motor armature and the two anodes 31 and 32 in precisely the same manner as in Fig. 1. The anodes are located in a single vessel or tube 33, having a heated cathode 34 and an auxiliary anode 35. The cathode 34 is heated from a battery 36. A suitable shield or partition 38 partially divides the vessel into two compartments, thus separating the electroionic discharges between the anodes and the cathode.

The auxiliary anode 35 is connected through a rheostat 40 to one terminal of the armature of a tachometer 41. This armature is carried by the armature of the motor and instantly responds to all variations in the speed of the motor. The tachometer is provided with a separately excited field as before. The other side of the tachometer armature is connected in series and in opposition with a battery 42 to the middle of the cathode 34. With valves having an auxiliary anode the voltage of the battery or the tachometer may normally predominate as desired.

The cycles of alternating current pass alternately through the two anodes of the electroionic valve, thereby impressing a pulsatory unidirectional current upon the motor armature. Variations in speed of the motor vary the difference in voltage between the tachometer and the battery 42, thus varying the voltage impressed between the auxiliary anode 35 and the cathode 34, and, on account of the variations in the voltage consumed in the valve, the voltage impressed between the motor armature terminals. By regulating the resistance in series with the auxiliary anode 35 the resistance of the valve can be varied and thereby the current to the motor can be controlled at will.

Figures 3, 4:
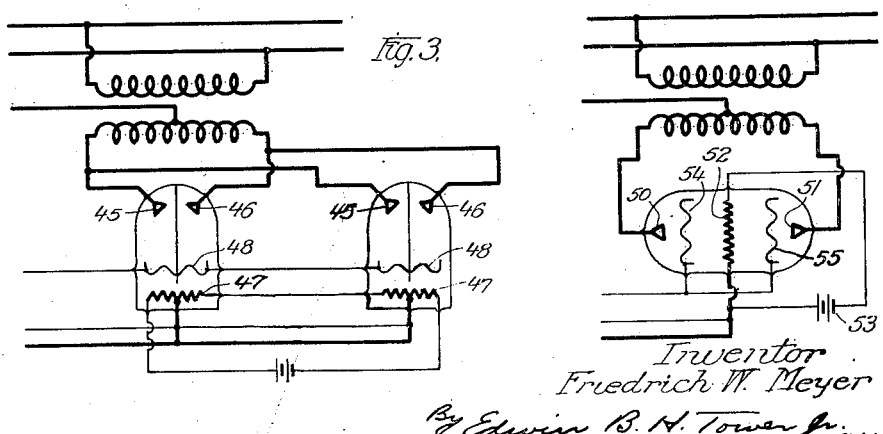
Fig. 3 shows how the electroionic valves may be connected in parallel to increase their current capacity.
Fig. 4 illustrates a modified form in which the duplex valve may be constructed.

Fig. 3 shows the connections for employing two electroionic valves in parallel for increasing the current which can be supplied and regulated. The two electroionic valves can be connected in operative position by placing Fig. 3 at the right of the dotted line in Fig. 2. Each valve has a pair of anodes 45 and 46, connected in parallel to the transformer secondary. The cathodes 47 are also connected in series, while the auxiliary anodes 48 are connected in series with the tachometer machine and battery. Variations in speed of the motor affect both of the auxiliary anodes equally and consequently the energy supplied by the two electroionic valves are controlled exactly as previously described.

Fig. 4 shows a form of duplex valve which experience has shown to be in many respects superior to that shown in Figs. 2 and 3. The duplex valve comprises a vessel which contains a pair of main anodes 50 and 51 and a common cathode 52 primarily heated by current from the battery 53. The cathode is located between two auxiliary anodes 54 and 55 which are connected to a battery tachometer and rheostat as before. The connections to the motor and tachometer have not been reproduced but the circuits may be readily followed by placing Fig. 4 at the right of the dotted line shown in Fig. 2. With this form of valve no separating partition, such as that shown in Figs. 2 and 3, is needed, and the combined effect of this type of valve has been found to be greater than that derived from two separate valves such as shown in Fig. 1 or the duplex valve shown in Figs. 2 and 3.

Fig. 5 shows apparatus for supplying current to and controlling a direct current motor from an alternating current source wherein an auxiliary electroionic relay is employed to control the heating of the cathodes of the main electroionic valves. The motor 60 is separately excited and drives a tachometer machine 61 as before. The tachometer machine working in opposition to a battery 62, however, controls the voltage impressed between an auxiliary anode 63 and a cathode 64 of an auxiliary electroionic relay 65. The auxiliary anode 63 may take the form of a grid in pure electronic or luminous discharge type valves. The cathode 64 of the relay is heated by a battery 66. A pair of main electroionic valves 67 and 68 have their cathodes 69 and 70 connected in series through a variable rheostat 71 to the main anode 72 of the relay 65, a battery 73 and cathode 64 of relay 65. The two cathodes and anodes of the main electroionic valves 67 and 68 are connected to the motor armature and the secondary terminals of a transformer 75, as previously described.

In order that the electroionic relay 65 may not have to carry the entire heating current required by the cathodes 69 and 70 a heating battery 76 controlled by an adjustable resistance 77 is provided. The normal heating current is thus supplied by battery 76 and the variations in temperature or control of cathodes 69 and 70 is effected by a superposed voltage or current supplied by battery 73 through the relay 65. If the heating current required is small, or it is not considered desirable or necessary to limit the current carried by relay 65, battery 76 and resistance 77 may be omitted.

The electroionic valves 67 and 68, each allowing current to flow in only one direction, supply unidirectional pulsatory current to drive motor 60. The tachometer machine 61, following exactly and instantaneously, coincidently or simultaneously the variations in the speed of the motor, correspondingly varies the flow of heating current through the main cathodes 69 and 70. These variations in temperature of the main cathodes instantaneously and increasingly affect the current supplied to the motor which is thereby regulated to a practically constant speed. The absence of mechanical inertia and self induction in the electroionic controlling and supply valves provides practically instantaneous, coincident or simultaneous correction for varying motor conditions, and hunting tendencies are materially lessened.

Fig. 6 shows an arrangement for separately controlling the electroionic valves and obtaining increasing regulating effects. The pair of main electroionic valves 80 and 81 which are shown to be of the arc discharge type, supply, from an alternating current source, the unidirectional pulsations for a separately excited direct current motor 82. The motor drives a tachometer 83 also having a separately excited field, as before described.

The control of both of the main electroionic supply and control valves 80 and 81 is effected in the same way, so only one need be described. Half of the main or working current which is supplied from the source to the motor passes through the electroionic valve 80. This valve is controlled by an electroionic relay 85, which in turn is controlled by an electroionic relay 86, which is controlled by the tachometer 83. The tachometer voltage is opposed to that of a battery 87 and in this case, normally predominates. When the tachometer voltage varies, the effect of the relay 86 varies and in turn causes the effect of the relay 85 to vary, which finally varies the effect of the regulating and supply valve 80.

The regulating valve 80 has an anode 87 and a cathode 88 and an auxiliary or ignition anode 89. An ignition battery 90, or other source, furnishes the current which creates the ignition spark or arc between the ignition anode 89 and the cathode 88. The ignition current from the ignition battery passes through the electroionic valve 80 to control the action thereof.

Relay 85 has an anode 95, an auxiliary anode 96, and a heated cathode 97. The anode 95 is connected to the cathode 88. The cathode 97 is heated by current from a battery 98. The auxiliary anode 96 may have the form of a grid and a supplemental voltage is impressed between this auxiliary anode and the cathode 97 by a battery 99 to control the action and effect of relay 85.

Relay 86 has an anode 100, a heated cathode 101 and an electromagnetic regulator 102. The cathode 101 is heated by current from a battery 103. A variable resistance 104 is provided in the circuit between cathodes 101 and 97 for adjusting the supplemental voltage. The electromagnet 102 is connected to the tachometer and battery 87 and its energization depends upon the difference between the tachometer and battery voltages.

When the tachometer voltage varies the electromagnet 102 distends or contracts the discharge path between the anode 100 and the cathode 101 of relay 86. The supplemental voltage between the auxiliary anode 96 and the cathode 97 is then altered to vary the voltage drop between the anode 95 and the cathode 97 of the relay 85, and thus to change the ignition voltage between the ignition anode 89 and the cathode 88. This change controls the number and form of current pulsations by controlling the starting points or the formation of the arc pulses or controls the character of the discharge between the anode 87 and the cathode 88 of the supply and regulating electroionic valve 80. This results in varying the amount of current flowing between anode 87 and cathode 88 to the motor as the motor speed varies, resulting in the maintenance of practically constant motor speed under variations in load or other conditions.

The speed and torque of the motor may be adjusted at will by varying the tachometer field through the agency of a battery 105 and a rheostat 106, or in other ways, as for instance, by varying the resistance 104 in the relay circuit or a resistance 107 in the tachometer circuit.

Fig. 7 shows how the system of Fig. 6 may be modified to control both main electroionic supply and control valves from a single set of relays. The ignition or formation of the arc pulses or the character or intensity of the arc discharge and consequently the flow of current through a pair of main electroionic valves 110 and 111 is controlled by the electroionic relay 112 which in turn is controlled by the electroionic relay 113.

The supplemental voltage between an auxiliary anode 114 and cathode 115 of relay 112, is varied by the action of an electromagnet 116 acting upon the discharge path between an anode 117 and a heated cathode 118 of relay 113. The action of electromagnet 116 depends upon the difference in voltage between a battery 121 and a separately excited tachometer 120 driven by the motor. As before explained, battery 121 and tachometer 120 are in opposition, the tachometer voltage normally predominating. The variations thus produced in the supplemental voltage between auxiliary anode 114 and heated cathode 115 of relay 112 controls the discharge through relay 112, varying the points of ignition or the character of the discharge and consequently the flow of unidirectional pulsatory currents through the main electroionic valves 110 and 111. Thus the current to the motor is practically instantaneously, coincidently or simultaneously varied to compensate for any variations in motor speed. The speed and torque of the motor may be adjusted at will, precisely in the same manner as explained for the system shown in Fig. 5. A double pole double throw switch 125 is shown to throw the relay 113 into and out of action. When the switch blades are thrown to the right the connections and operation of the system are those just described. When, however, the switch is thrown to the left the relay 113 is withdrawn from service and the tachometer directly affects relay 112.

For the purpose of simplifying the illustration, batteries have been shown herein in many instances, but it will be understood that other sources of supply may be employed.

The embodiments of the invention which have been given herein have been selected merely for the purpose of simply and clearly illustrating the principles involved and it will be understood that the invention contained herein is susceptible of many other embodiments and adaptions depending upon the conditions and the results to be obtained.

What I claim is:

1. The combination with a source of alternating current, a direct current dynamo electric machine, an electroionic valve through which the alternating current is converted into unidirectional pulsations for the machine, and a tachometer driven by said machine and creating an electromotive force which controls the discharge characteristics of the electroionic valve substantially coincidently with speed variations of said machine.

2. A regulator for a direct current dynamo electric machine to be operated by current from an alternating current source, comprising an electroionic valve through which the alternating current is converted into unidirectional pulsations for the machine, and means responsive to speed variations of the machine and coincidently controlling the action of the valve to regulate the amount of pulsatory current supplied to the machine.

3. Apparatus for operating and controlling a direct current dynamo electric machine from an alternating current source, having a static rectifier for converting the alternating current into unidirectional pulsations which are impressed upon the direct current machine, and means responding coincidently to varying conditions of the machine for directly controlling the action of the rectifier.

4. A system for operating and controlling a direct current dynamo electric machine from an alternating current, comprising a source of alternating current, a static rectifier for converting the alternating current into unidirectional pulsations, a direct current dynamo electric machine upon which the unidirectional pulsations are impressed, and means directly responsive to speed variations of said machine and coincidently influencing the action of said rectifier to vary the amount of current rectified in accordance with the requirements of the machine.

5. The combination with a source of alternating current, of a transformer connected to said source, a pair of static rectifiers connected to said transformer, a direct current dynamo electric machine connected to said transformer and said rectifiers, and a tachometer driven by said machine and controlling the action of said rectifiers coincidently with and in response to speed variations of said machine.

6. The combination of a direct current motor, a source of alternating current, an electroionic valve through which the alternating current is converted into unidirectional pulsations for the motor, and means responsive to speed variations of the motor and simultaneously controlling the action and effect of said electroionic valve to regulate the power supplied to the motor.

7. The combination of a source of alternating current, an electroionic valve and transformer for converting the alternating current into unidirectional pulsations, a direct current dynamo electric machine upon which the pulsations are impressed, and means responsive to speed variations of the machine and coincidently controlling the action of said electroionic valve to regulate the amount of pulsatory current supplied to said machine.

8. The combination of an electroionic valve for converting alternating current into pulsatory direct current, a direct current motor adapted to be driven by the current pulsations thus produced, and means instantaneously following the speed variations of the motor and coincidently controlling the action of said electroionic valve to regulate the input to the motor.

9. The combination of a direct current motor, a source of alternating current, a transformer, an electroionic valve connected to said motor and said transformer whereby the alternating current from the source is converted into unidirectional current for the motor, means responsive to speed variations of the motor, and an electroionic relay instantaneously controlled by said means and coincidently regulating the action of said valve whereby the pulsatory current supplied to the motor depends upon the operation of the motor.

10. A regulator for a direct current dynamo electric machine to be operated by current from an alternating current source, comprising an electroionic valve, through which the alternating current is converted into unidirectional pulsations, coincidently controlled by and in accordance with speed variations of the machine to regulate the amount of pulsatory current supplied thereto.

In witness whereof, I have hereunto subscribed my name.

FRIEDRICH WILHELM MEYER.